UNITED STATES PATENT OFFICE.

ANTHONY PFUND, OF NEW YORK, N. Y.

IMPROVEMENT IN COMPOUNDS FOR HYDRAULIC CEMENT.

Specification forming part of Letters Patent No. 135,582, dated February 4, 1873.

*To all whom it may concern:*

Be it known that I, ANTHONY PFUND, of the city, county, and State of New York, have invented a new and Improved Compound for Hydraulic Cement, and other purposes; and I do hereby declare the following to be a full, clear, and exact description thereof, which will enable those skilled in the art to make and use the same.

This invention is based on the treatment of a mineral which I term the "Pfundite," and is found in the county of Northampton, State of Pennsylvania, and which, according to a careful analysis, contains the following ingredients:

| | |
|---|---|
| Silica | 61.30 |
| Alumina | 21.85 |
| Oxide of iron | 14.10 |
| Lime | 1.30 |
| Magnesia | .63 |
| Hygrometer moisture, and loss | .82 |
| | 100.00 |

My invention consists in a compound produced by heating the Pfundite to a red heat, whereby the silica is caused to combine with the oxide of iron and with parts of the alkaline earths; and, if this product is mixed with sulphate or carbonate of lime, the mass becomes hard in a short time and capable of resisting moisture.

I have also mixed with the Pfundite a quantity of carbonate of lime and alkalies, in the proportion of from three to four parts of lime to one part of silica, alumina, and oxide of iron and alkali. This mixture I form into bricks, which are burned at a red heat, and when cold, pulverized. The product thus obtained forms a superior hydraulic cement.

The Pfundite after having been heated to a red heat, can also be mixed with coal-ashes in about the following proportion: Burned Pfundite, one part; hydraulic lime, cement, or plaster Paris, two parts; coal ashes, five to six parts.

This mass, when mixed with a sufficient quantity of water, can be formed into bricks, or it can be used with advantage for coating walls or other similar purposes. The mass obtained by these means is fire-proof.

I have also mixed with the burned Pfundite a quantity of pulverized charcoal, sawdust, peat, ground bark, or other similar bad conductor of heat, in about the following proportion: Lime or cement, mixed with water, one part; pulverized charcoal, sawdust, or other bad conductor of heat, from three to four parts.

After these ingredients have been thoroughly mixed, I take lime or hydraulic lime, or plaster Paris, one part; burned Pfundite, one-half part; add thereto a sufficient quantity of water to produce a stiff paste, and mix this paste with the paste of lime and sawdust above described. This mixture is molded in any desired form, and it can be used with advantage for filling of ice-houses or other buildings, where it is desirable to exclude the external air and moisture.

It is obvious that these mixtures can be varied, according to the firmness required, by changing the proportions of the ingredients; but in all cases no more water must be used but just sufficient to dissolve the lime or cement, and to inclose the materials added thereto. If the quantity of water is not too large, the mass can be molded immediately and removed from the molds in a short time.

Walls coated with the third compound above described dry quick, and they can be cleaned and whitewashed without delay. They serve to produce a dry and fire-proof building.

The fourth compound above described, being composed entirely of bad conductors of heat, produces a superior filling for the walls of ice-houses.

What I claim as new, and desire to secure by Letters Patent, is—

1. A compound produced by subjecting Pfundite to a red heat, substantially as described, whether alone or previously or subsequently combined with other materials, as set forth.

2. A compound produced by burning Pfundite, then mixing it with hydraulic lime or cement, and with sawdust, peat, charcoal, or other bad conductor of heat, substantially as set forth.

ANTHONY PFUND.

Witnesses:
W. HAUFF,
E. F. KASTENHUBER.